United States Patent Office 2,865,957
Patented Dec. 23, 1958

2,865,957

PREPARATION OF PETROLEUM SULFONIC ACIDS AND SULFONATE DERIVATIVES THEREOF

Richard S. Logan, Bartlesville, Okla., assignor to Phillips Petroleum Company, a corporation of Delaware No Drawing. Application November 25, 1955
Serial No. 549,197

8 Claims. (Cl. 260—504)

This invention relates to petroleum sulfonic acids and their sulfonate derivatives, especially oil solutions of the same, which may be prepared by the treatment of petroleum oils with a sulfonating agent. In one aspect it relates to the separation of petroleum sulfonic acids from sulfonation mixtures containing the same. In another aspect it relates to the production of sulfonic acids and metal sulfonate derivatives thereof from a selected hydrocarbon fraction. In another aspect it relates to lubricating compositions containing novel detergent additives.

At the present time it is common practice to enhance or modify certain of the properties of lubricating oils through the use of various additives or improvement agents. The lubricating oils employed in internal combustion engines, such as automotive, light aircraft, and diesel engines in particular, require the use of additive agents to render them serviceable under the adverse environmental conditions encountered in these engines. Among the various additives employed in modern engine oils, one of the most important is the type which acts to prevent accumulation of sludge in the crankcase and on the cylinder walls, thereby preventing sticking of the piston rings, and the formation of varnish-like coating on the pistons and cylinder walls. Because of their general function of maintaining a clean engine, additives of this nature are termed "detergents," although it is now believed that they have little utility in cleaning a dirty engine but by virtue of dispersant activity prevent or greatly retard engine fouling.

Many petroleum sulfonic acid derivatives have been employed in the past as detergent additives for lubricating oils. Because of the complexity of petroleum, the exact chemical nature of its sulfonic acid derivatives is very difficult to ascertain accurately. The source of the crude petroleum used in the production of sulfonic acids is one of the several variables which determine the predominant organic nature of the latter, i. e., paraffinic, naphthenic, or aromatic. In the absence of chemical analysis, the petroleum sulfonic acids and sulfonates are usually classified according to their relative solubility in oil and the particular stock material from which they are made.

Specific alkaline earth metal-containing detergents such as barium or calcium sulfonates have been widely used in the past and these have served satisfactorily in many cases for imparting detergent properties to mineral oils. The petroleum fractions used in preparing these prior art sulfonates are mostly unrefined or semi-refined base oil stocks of relatively low viscosity and relatively low molecular weight. The base oil used in the preparation of such sulfonates is often a naphthenic oil of SAE 10W or 20 viscosity grade having molecular weight in the order of 300 to 500.

The conventional method of preparing petroleum sulfonates usually comprises the following steps: (1) treatment of naphthenic base oil with concentrated or fuming sulfuric acid to produce a complex mixture of sulfonation products; (2) removal of the resulting acid sludge layer which generally comprises excess acid, oil-insoluble sulfonic acids and various other organic compounds; (3) neutralization of the oil layer containing oil-soluble sulfonic acids, for example, with sodium hydroxide; (4) extraction of the resulting sodium petroleum sulfonates with aqueous alcohol; and, (5) conversion to other metal petroleum sulfonates by contacting with a metal salt solution or metal hydroxide such as calcium chloride or barium hydroxide.

It has heretofore been found impossible to produce by conventional sulfonation methods oil-soluble sulfonates from high molecular weight hydrocarbon fractions, such as a bright stock having a viscosity of about 200 SUS at 210° F., because treatment of such highly refined lubricating oil stocks with fuming sulfuric acid produced no separation of acid sludge. Neutralization of the resulting acid-oil mixture with sodium hydroxide resulted in a very stable emulsion. Extraction of the sodium petroleum sulfonate from such emulsion produced a low yield of product which was, in each case, contaminated with inorganic salts.

Since petroleum sulfonic acids themselves cannot be readily purified, it is necessary to isolate the acids from the sulfonation mixture in order that they may be purified in the form of their sulfonate derivatives. Therefore, it was desirable when employing conventional sulfonation procedures to cause the separation of an acid sludge so as to enable a more efficient separation and purification of the petroleum sulfonic acids. Accordingly, I provide by the practice of this invention an improved method for the production of petroleum sulfonic acids and their sulfonate derivatives from high molecular weight hydrocarbon fractions whereby the aforementioned separation and emulsion difficulties heretofore encountered when sulfonating these particular hydrocarbon fractions are not present. Broadly contemplated, my invention comprises treating a high molecular weight hydrocarbon fraction, such as a solvent refined, bright stock having a viscosity of about 200 SUS at 210°, with a sulfonating agent such as fuming sulfuric acid, coagulating the acid phase in the resulting complex sulfonation mixture with concentrated sulfuric acid whereby an acid sludge settles out and is subsequently removed. Subsequent purification of the petroleum sulfonic acids can be carried out by the conventional steps of extracting the resulting oil solution with a polar organic solvent such as aqueous alcohol, neutralizing, and converting the petroleum sulfonic acid extracts to metal petroleum sulfonates. By the practice of this invention, an acid sludge forms which may be readily separated by settling or mild centrifuging the sulfonation mixture whereby the subsequent purification of the petroleum sulfonic acids may be accomplished in an efficient manner by procedures well known to those skilled in the art. The acid sludge obtained comprises mostly spent sulfuric acid and since only a minor amount of other organic material separates with this spent acid, this acid sludge would be more properly termed an acid phase rather than an acid sludge. It is believed that one of the primary reasons for characterizing this as an acid phase rather than an acid sludge is that the high molecular weight stock material is solvent refined, that is, it has been treated with phenol, for example, to remove aromatics and therefore the acid phase is substantially free of suspended material.

The resulting oil solutions prepared by my invention containing the metal petroleum sulfonates can be readily mixed or blended with any lubricating oil, such as an SAE 10W, 20 or 30 and the mixture or blend advantageously employed as a lubricating oil having very desirable lubricating properties.

An object of this invention is to provide an improved method for the production of petroleum sulfonic acids and their sulfonate derivatives.

Another object is to provide an improved method for the production of petroleum sulfonic acids whereby increased yields are recoverable from complex sulfonation mixtures.

Another object is to provide an improved method for the production of sulfonic acids and their sulfonate derivatives, especially oil solutions of the same, by sulfonating highly refined, solvent extracted, high molecular weight petroleum fractions.

Another object is to overcome the difficulties of separation heretofore encountered in separating complex sulfonation mixtures obtained by the sulfonating of high molecular weight petroleum fractions.

A further object is to prevent the accumulation of oil degradation products on oil-lubricating engine parts, such as pistons and cylinder walls, and to prevent accumulation of crank case sludge, especially under cold engine, stop and go conditions.

A still further object is to provide improved lubricating compositions containing a small but effective amount of a novel detergent additive having the ability to minimize the deposition and the accumulation of oil degradation products on oil lubricated engine parts.

Other objects, advantages and features of this invention will become apparent to those skilled in the art from the accompanying specification and appended claims.

It has been found that failure of an acid sludge to separate from a sulfonation mixture obtained by sulfonating the more viscous bright stock fractions of petroleum and the attendant emulsion difficulties occur when the stock has a viscosity of about 80 SUS at 210° F. or higher. Accordingly, my invention is applicable only to sulfonation processes in which the bright stock has a viscosity of at least 80 SUS at 210° F. Generally, I employ deasphalted and solvent-defined petroleum fractions having a viscosity between about 80 and 700 SUS at 210° F. and an average molecular weight of about 540 to 1,300, and more preferably petroleum fractions having a viscosity between about 150 and 600 SUS at 210° F. and an average molecular weight of about 675 to 900. A specifically preferred sulfonation stock is a propane-fractionated, solvent-extracted and de-waxed Mid-Continent oil of about 200 to 230 SUS at 210° F. having a viscosity index of about 85 to 100, or even higher.

Sulfonating agents which are known to the art can be utilized in the sulfonation step of my novel process including fuming sulfuric acid, chlorosulfonic acid and sulfur trioxide. Fuming sulfuric acid is the preferred sulfonating agent because it is inexpensive and readily available and is particularly adapted to this novel process for producing oil-soluble metal petroleum sulfonates of high molecular weight. The fuming sulfuric acid can vary from 10 weight per cent excess $SO_3$ to 40 weight percent $SO_3$; however, I prefer to use commercial fuming sulfuric acid, which has about 200 weight percent excess $SO_3$.

Sulfonation temperatures are usually controlled within the range of about 50 to 200° F. with the preferred operating range being between 80 and 165° F. Somewhat lower temperatures can be employed without seriously slowing the reaction rates, but no particular advantage results from operating in this manner and it is advantageous to sulfonate at the elevated temperatures, i. e., 50 to 200° F., in order to reduce the time required for the sulfonation step. At temperatures about 200° F., excessive oxidation with liberation of sulfur dioxide takes place. The oil-acid weight ratio varies with the sulfonation temperature but generally can be in the range of from 1 to 0.175 and 1 to 0.7. The sulfonation reaction is usually carried out at atmospheric pressure although pressures greater or less than atmospheric can be employed if desired.

As pointed out heretofore, it has been found impossible to produce by conventional methods oil-soluble petroleum sulfonic acids and their sulfonates from high molecular weight hydrocarbon fractions such as a bright stock having a viscosity of about 200 SUS at 210° F., because treatment of such highly refined lubricating oil stocks with fuming sulfuric acid produced no separation of acid sludge. When an attempt is made to produce oil-soluble petroleum sulfonates according to the conventional methods, low yields, emulsion difficulties, and purification difficulties are encountered. I have found that the separation of the spent sulfuric acid from the complex sulfonation mixtures obtained by sulfonating these high molecular weight hydrocarbon fractions may be effected by treating the sulfonation mixture with concentrated sulfuric acid. Upon settling or mild centrifuging, the thus treated sulfonation mixture stratifies forming two immiscible layers comprising a top layer of petroleum sulfonic acids in oil and a bottom layer comprising mainly spent sulfuric acid. In order to effect a greater degree of separation, I prefer to treat the oil layer with an organic diluent, such as pentane.

Generally, I prefer to treat the sulfonation mixture with 50–98% concentrated sulfuric acid, and more preferably 75 to 95% concentrated sulfuric acid. The amount of concentrated sulfuric acid employed in the practice of this invention will vary with the amount of fuming sulfuric acid employed in sulfonating the high molecular weight petroleum fractions, and to a lesser extent upon the sulfonation temperature, coagulating temperature and other conditions which will become apparent to those skilled in the art when acquainted with my invention. Generally, the weight ratio of concentrated sulfuric acid to fuming sulfuric acid will be in the range of 0.5 to 1 and 5 to 1. Generally, the coagulating temperature I prefer to employ will be in the range of 50 to 140° F.

The separation of the spent sulfuric acid can be more effectively accomplished by adding a diluent either prior to or after the addition of the concentrated sulfuric acid; or it can be added after removing the initial acid phase. The diluents I prefer to employ are non-aromatic hydrocarbons or diluents which contain non-sulfonatable aromatics under the conditions of sulfuric acid treatment. Representative diluents which can be used in effecting a higher degree of acid separation include, for example, the pentanes, hexanes, octanes, gasoline, kerosene, SAE 10W lubricating base oil, and the like, or mixtures thereof.

After separating the acid layer from the oil layer, the acid layer can be worked up by stripping to remove sulfur dioxide and the acid recycled to the phase separation stage. The resulting oil solution of petroleum sulfonic acids is extracted with a polar organic solvent such as aqueous isopropanol and the resulting alcoholic extracts are neutralized by contacting with an aqueous solution or slurry of a metal salt, oxide or hydroxide, thereby converting the petroleum sulfonic acids to the corresponding metal petroleum sulfonates.

All metals are suitable for preparing these metal petroleum sulfonates. Metals which are particularly suitable for preparing the metal petroleum sulfonates of this invention include barium, calcium, lithium, potassium, nickel, cobalt, cadmium, silver, iron, aluminum, copper, magnesium, lead, beryllium, mercury, sodium, tin, and zinc. The alkaline earth metals are preferred and barium and, more especially, calcium are specifically preferred in the practice of this invention.

The neutralization step may be conveniently carried out in the temperature range of 200–400° F. and at a pressure sufficient to prevent evaporation of the volatile materials present. The extracts are thus contacted for a period of time generally in the range of 30 minutes to 5 hours. Prior to neutralization, care must be exercised to prevent formation of black resinous material which will occur if the oil solution is heated above 140–150° F.

Although the steps in treating the oil solution of petroleum sulfonic acids subsequent to the separation of the acid layer from the sulfonation mixture are well known to those skilled in the art, I prefer to employ those steps outlined above and it should be understood that I do not intend to limit the practice of my invention to those particular methods of extraction, neutralization and purification mentioned.

The metal petroleum sulfonate-oil solution prepared according to my invention can be added to any mineral or lubricating base oil to provide finished lubricating oils having desirable detergent properties. Generally, the finished lubricating oils will comprise about 0.1 to 20 weight percent of oil-soluble metal petroleum sulfonate and preferably 4 to 16 weight percent. As detergent additives for lubricating oils, I prefer to employ the barium and calcium petroleum sulfonates prepared by my invention.

The advantages of this invention are illustrated in the following examples. The reactants and the proportions and their specific ingredients are presented as being typical and should not be construed to unduly limit the invention.

EXAMPLE I

A reaction vessel was charged with 400 grams of a deasphalted, solvent refined Mid-Continent petroleum fraction having a viscosity of 203 SUS at 210° F., and a viscosity index of 93. To this was added with stirring 160 grams of fuming sulfuric acid (20 weight percent excess $SO_3$), and the temperature of the reaction was maintained in the range of 90 to 110° F. After reaction was complete, the sulfonation mixture was divided into 4 portions of 60 cc. each and these portions were treated as follows:

One 60 cc. portion of the sulfonation mixture was mixed with 10.5 cc. of 98% concentrated sulfuric acid. The resulting mixture was allowed to stratify and after 24 hours only 4 cc. of acid phase had separated. No further separation occurred during the next 4 days.

To a second 60 cc. portion of the sulfonation mixture was added with mixing 11 cc. of 85% concentrated sulfuric acid. After 24 hours 13 cc. of acid phase separated and was removed. No further separation occurred. Twenty cc. of n-pentane was added to the remaining sulfonation mixture with agitation. After one hour 15 cc. of acid phase separated and after 24 hours 18 cc. of acid phase separated.

To a third 60 cc. portion of the sulfonation mixture was added with mixing 17 cc. of 50% concentrated sulfonic acid. After 24 hours about 5 cc. of acid phase separated and was removed. No additional separation occurred. Twenty cc. of n-pentane was added to the remaining sulfonation mixture with agitation. No separation of acid phase occurred after one hour; after 24 hours about 7 cc. of acid phase had separated but coalesence of the separated droplets of acid was poor.

To the fourth 60 cc. portion of sulfonation mixture 20 cc. of n-pentane was added with mixing and no separation of acid phase occurred after 24 hours.

From the above examples it is thus apparent that optimum separation of the spent sulfuric acid from the sulfonation mixture is accomplished by treating the same with 85% concentrated sulfuric acid and an organic diluent such as n-pentane. Thus, for most economic operation, I prefer to employ about 75 to 95% concentrated sulfuric acid, although it is to be understood that I do not intend to limit my invention to this particular concentration of concentrated sulfuric acid since some separation of value may be accomplished by employing 50 to 98% concentrated sulfuric acid, particularly when used in conjunction with an organic diluent.

EXAMPLE II

To a reaction vessel equipped with a stirrer was charged 396 grams of a solvent refined, deasphalted, and dewaxed lubricating oil stock derived from Mid-Continent crude petroleum having a viscosity of 4278 SUS at 100° F., a viscosity of 203 SUS at 210° F., and a viscosity index of 93. This petroleum stock was diluted with 165 grams of n-hexane and the mixture heated to 131° F. To this was added with stirring 116 grams of 20% fuming sulfuric acid. During this period of acid addition, the temperature was held in the range of 130 to 150° F. and was usually about 145° F. Twenty five minutes were required to add the acid and after addition of acid, agitation was continued for 30 minutes. Additional n-hexane was added for that which was lost. After sulfonation was complete, 127 grams of 95% sulfuric acid was added with agitation. The acid treated sulfonation mixture was allowed to stratify into two immiscible layers and 176 grams of darkly colored acid phase substantially free of suspended matter was removed from the bottom. This acid phase contained the bulk of sulfuric acid present in the mixture. The top phase, which comprises a dark oil solution of petroleum sulfuric acid was filtered and stripped at 100° F. under vacuum to remove sulfur dioxide. The filtrate was extracted 4 times with aqueous isopropanol as follows:

First—1 vol. of 69% alcohol+31% water
Second—1 vol. of 65% alcohol+35% water
Third—1 vol. of 65% alcohol+35% water
Fourth—1 vol. of 100% alcohol+0 water The four alcoholic extracts of the oil solution were combined and neutralized with an appropriate amount of a saturated solution of barium hydroxide. Curds of barium petroleum sulfonates precipitated out and settled to the bottom. The top aqueous phase was removed and the precipitate was diluted with n-pentane and washed with water to insure removal of inorganic salts. Pentane was stripped from the precipitate and the final barium petroleum sulfonate-oil solution contained 27 weight percent sulfated ash and a yield of 50 weight percent based on the petroleum oil stock. Further analysis of the barium petroleum sulfonate-oil solution showed it to contain 21 weight percent barium; this percentage is in excess of the amount of barium that would be normally found and is indicative of a "super base" barium petroleum sulfonate. This product was found to be about 50 percent insoluble in methyl isobutyl ketone.

EXAMPLE III

The metal petroleum sulfonate-oil solution prepared above in Example II was evaluated as a lubricating oil additive by dissolving the same in a solvent refined SAE 30 lubricating oil containing no oxidation inhibitor. Two different concentrations were thus prepared which yielded oil-additive solutions containing the same number of milliequivalents of metal as do 1 and 2 percent solutions of a commercially available detergent sold under the trade name "Paranox 64" and comprising an alkaline earth metal salt of an alkylphenol sulfide.

The resulting blends were then evaluated in a mounted single cylinder H2 Lauson test engine, operated under conditions simulating a CRC L-4 test condition, such as described in "Motor Oils and Engine Lubrication" by Carl W. Georgi (Reinhold Publishing Corp., 1950), beginning at page 83. The evaluation performed consists of placing the lubricating oil blend in the crankcase of a single cylinder engine, operating the engine under 1.2 H. P. load at 1600±20 R. P. M., while maintaining a cooling jacket temperature of 210° F., an oil temperature of 310° F., and an air to fuel ratio of 13.5:1. At the end of 60 hours operation under these conditions, the engine was stopped, disassembled, and the piston examined.

The piston varnish was rated on an arbitrary scale of 1 to 10, the value 10 representing as nearly perfect as ascertainable, number 1 being "very poor" and numbers 2 to 9 each representing intermediate ratings.

For purposes of comparison, blends of the same base lubricating oil with 1 and 2% solutions of a Paranox 64 were prepared and evaluated in exactly the same manner as were the additive solutions of the present invention. As a standard for further evaluation of the blends of the additive-base oil solutions of the present invention, the same base oil, but without any additive, was tested in exactly the same manner. The following is a tabulation of the results of the Lauson type engine test described:

Table I

| Run | Material | Equivalent Conc. of Paranox-64 on Metal Content Basis | Piston Varnish Rating |
|-----|----------|------|------|
| 1 | Base oil (SAE 30) | 0 | 5.8 |
| 2 | ----do---- | 0 | 6.3 |
| 3 | Base oil + Paranox-64 | 1 | 4.2 |
| 4 | ----do---- | 2 | 8.8 |
| 5 | Base oil + metal petroleum sulfonate | 1 | 6.5 |
| 6 | ----do---- | 2 | 7.2 |

The data listed in the preceding tabulation clearly illustrate that the metal petroleum sulfonates prepared from the petroleum sulfonic acids by the practice of this invention are comparable in effectiveness with a well established commercial metal-containing detergent.

As will be evident to those skilled in the art, various modifications can be made or followed, in the light of the foregoing disclosure and discussion, without departing from the scope of my invention.

I claim:

1. A method for recovering oil-soluble petroleum sulfonic acids from a sulfonation mixture prepared by sulfonating a deasphalted and solvent-refined petroleum bright stock having a viscosity between about 80 and 700 SUS at 210° F., which method comprises treating the sulfonation mixture with concentrated sulfuric acid, permitting the resulting admixture to stratify thereby forming two immiscible phases including a top phase comprising petroleum sulfonic acids in an oil solution and a bottom phase comprising spent sulfuric acid, and isolating said top phase as the product of the process.

2. A method for recovering oil-soluble petroleum sulfonic acids from a sulfonation mixture prepared by sulfonating with fuming sulfuric acid a deasphalted and solvent-refined petroleum bright stock having a viscosity between about 80 and 700 SUS at 210° F., which method comprises treating the sulfonation mixture with 50–98 percent sulfuric acid and a hydrocarbon diluent, permitting the resulting admixture to stratify thereby forming two immiscible phases including a top phase comprising petroleum sulfonic acids in an oil solution and a bottom phase comprising spent sulfuric acid, and isolating said top phase as the product of the process.

3. A method for recovering oil-soluble petroleum sulfonic acids from a sulfonation mixture prepared by sulfonating with fuming sulfuric acid a deasphalted and solvent-refined petroleum bright stock having a viscosity between about 150 and 600 SUS at 210° F., which method comprises treating the sulfonation mixture with 75–95 percent sulfuric acid and n-hexane, permitting the resulting admixture to stratify thereby forming two immiscible phases including a top phase comprising petroleum sulfonic acids in an oil solution and a bottom phase comprising spent sulfuric acid, and isolating said top phase as the product of the process.

4. In a method for producing oil-soluble metal petroleum sulfonates which comprises sulfonating a deasphalted and solvent-refined petroleum bright stock having a viscosity between about 80 and 700 SUS at 210° F., neutralizing the resulting sulfonic acids, and converting the same to metal petroleum sulfonates, the improvement comprising treating the sulfonation mixture with concentrated sulfuric acid, permitting the resulting admixture to stratify thereby forming two immiscible phases including a top phase comprising said sulfonic acids in an oil solution and a bottom phase comprising spent sulfuric acid, and removing said bottom phase.

5. A method for preparing oil-soluble metal petroleum sulfonates which comprises sulfonating with fuming sulfuric acid a deasphalted and solvent-refined petroleum bright stock having a viscosity between about 80 and 700 SUS at 210° F., treating the resulting sulfonation mixture with 50–98 percent sulfuric acid and a hydrocarbon diluent, permitting the resulting admixture to stratify thereby forming two immiscible phases including a top phase comprising said sulfonic acids in an oil solution and a bottom phase comprising spent sulfuric acid, removing said bottom phase, extracting said sulfonic acids with an organic solvent, converting said sulfonic acids to metal petroleum sulfonates, and recovering the oil-soluble metal petroleum sulfonates as the product of the process.

6. A method for preparing oil-soluble metal petroleum sulfonates which comprises sulfonating with fuming sulfuric acid a deasphalted and solvent-refined petroleum bright stock having a viscosity between about 150 and 600 SUS at 210° F., treating the resulting sulfonation mixture with 75 to 95 percent sulfuric acid and n-hexane, permitting the resulting admixture to stratify thereby forming two immiscible phases including a top phase comprising said sulfonic acids in an oil solution and a bottom phase comprising spent sulfuric acid, removing said bottom phase, extracting said sulfonic acids with an organic solvent, converting said sulfonic acids to metal petroleum sulfonates by reaction with a metal compound selected from the group consisting of salts, oxides, and hydroxides, and recovering said metal petroleum sulfonates as the product of the process.

7. The method of claim 6 wherein said metal compound is barium hydroxide.

8. The method of claim 6 wherein said metal compound is calcium hydroxide.

References Cited in the file of this patent

UNITED STATES PATENTS

| | | |
|---|---|---|
| 2,400,298 | Jones et al. | May 14, 1946 |
| 2,406,763 | Griesinger | Sept. 3, 1946 |
| 2,413,311 | Cohen | Dec. 31, 1946 |
| 2,467,179 | Zimmer et al. | Apr. 12, 1949 |
| 2,532,997 | Cohen | Dec. 5, 1950 |
| 2,660,562 | Axe et al. | Nov. 24, 1953 |
| 2,702,819 | Axe et al. | Feb. 22, 1955 |
| 2,710,303 | Whitney | June 7, 1955 |
| 2,760,970 | LeSuer | Aug. 28, 1956 |